July 15, 1941. E. HANSON 2,248,989
INTERNAL COMBUSTION ENGINE
Filed Aug. 28, 1939 4 Sheets-Sheet 1

INVENTOR.
EDWARD HANSON.
BY
ATTORNEY.

July 15, 1941.  E. HANSON  2,248,989
INTERNAL COMBUSTION ENGINE
Filed Aug. 28, 1939  4 Sheets-Sheet 3

INVENTOR.
EDWARD HANSON.
BY Geo. B. Pitts
ATTORNEY.

Patented July 15, 1941

2,248,989

UNITED STATES PATENT OFFICE 2,248,989

INTERNAL COMBUSTION ENGINE

Edward Hanson, Cleveland, Ohio

Application August 28, 1939, Serial No. 292,226

22 Claims. (Cl. 123—1)

This invention relates to an internal combustion engine and consists of certain novel features which may be embodied in various types of such engines including that shown in my co-pending application filed November 16, 1937, Serial No. 174,784, now Letters Patent No. 2,170,818, dated August 29, 1939.

One object of the invention is to provide in an engine of this type, improved means for supplying a combustible medium into its combustion chamber, whereby the efficiency of the engine is increased; that is, firing may be more accurately controlled, and the entire charge of combustible medium is ignited at a highly rapid rate, so that danger of unburned medium being wasted and accumulation of carbon are substantially eliminated.

Another object of this invention is to provide improved means for injecting the combustible medium into the cylinder of an internal combustion engine in a gaseous or vaporized form so as to effect an accurate means of measuring the quantity of fuel charge required for combustion and to insure a more uniform mixture of air and fuel than has been possible heretofore.

Another object of the invention is to provide an improved engine of this type wherein the combustible medium is injected into the combustion space by a plurality of nozzles to insure complete combustion thereof.

Another object of the invention is to provide an improved engine of this type wherein fuel is injected into the combustion space through a plurality of nozzles constructed and arranged so as to effect a turbulence of the air and admixture of the fuel therewith.

Another object of the invention is to provide an improved engine wherein provision is made to supply pure air to the cylinder and to inject fuel into the air during its stage of compression in directions which cause an admixture of the fuel and air and set up a swirling or rotating condition in the combustible charge, so that rapid and uniform flame propagation of substantially the entire charge takes place.

Another object of the invention is to provide an improved engine that may be readily converted for operation from gaseous fuel to liquid fuel.

Another object of the invention is to construct an improved engine wherein provision is made for discharging from the cylinder unburned fuel in each combustion and returning it to the source of fuel supply, whereby greater economy in fuel results.

Another object of the invention is to provide an improved process of supplying and mixing air and a combustible medium for an internal combustion engine.

Other objects of the invention will be apparent to those skilled in the art to which my invention relates from the following description taken in connection with the accompanying drawings, wherein.

Figure 1:
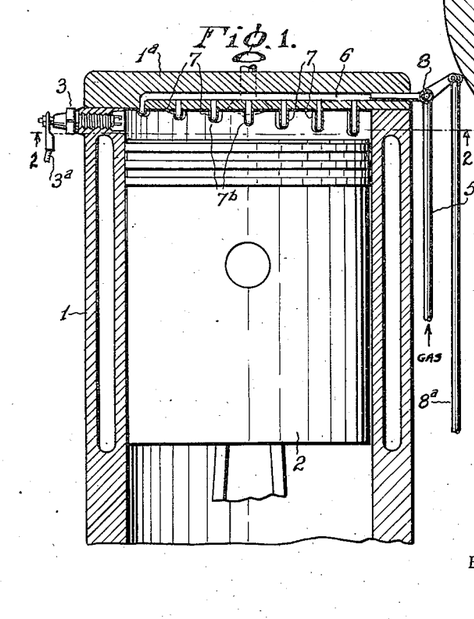
Fig. 1 is a fragmentary section of a four cycle internal combustion engine embodying my invention.
Figure 2:
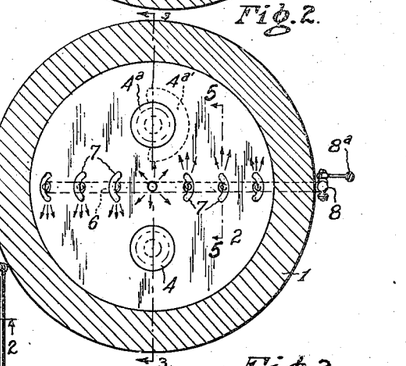
Fig. 2 is a section on the line 2—2 of Fig. 1.
Figure 3:
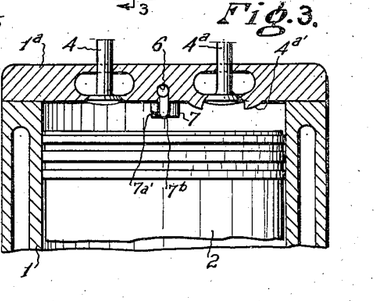
Fig. 3 is a section on the line 3—3 of Fig. 2.

Referring to Figs. 1 to 6, inclusive, I indicates as an entirety a cylinder for a four cycle engine, which may consist of as many cylinders as desired, and 2 indicates as an entirety a piston therein arranged to be operated in the usual manner by a crank shaft (not shown), the piston being shown in its upper-most position and forming between it and the cylinder head 1a a combustion space. 3 indicates a suitable spark plug connected by a lead 3a to the ignition system (not shown), to provide for ignition where the compression is below that which would cause combustion due to heat. 4 indicates an exhaust valve, shown, by preference, in the cylinder head 1a. 4a indicates an intake for pure air, also suitably mounted in the head 1a. The wall surrounding the air intake opening is provided with a shroud 4a', the purpose of which is to impart to the incoming air a circular or rotational motion. The valves 4, 4a, are operated by suitable cams (not shown). The fuel is supplied under pressure through a suitable manifold the construction and arrangement of which will depend upon the arrangement of the cylinders, the manifold shown comprising a pipe 5, arranged to supply to the cylinder from a suitable source fuel or vapor. The pipe 5 is connected to the outer end of a conduit 6 formed in and extending diametrically of the head 1a and having in its lower wall spaced ports, each connected to a nozzle or injector 7 projecting downwardly into the combustion space. Each nozzle 7 is closed by a wall 7a at its lower end and its side wall adjacent its bottom wall is formed with an exit or discharge opening 7a' to effect a discharge of the fuel laterally. The nozzles 7 are of different lengths, progressively, from one side of the cylinder to the other side thereof, so as to discharge the fuel simultaneously at different levels. Each nozzle 7 is preferably of substantially crescent shape in cross section and the discharge openings 7a' therein are arranged to effect a swirl to the fuel and resulting turbulence in the admixture of air and fuel so that flame propagation is uniform and rapid and efficient combustion results. As shown in Fig. 2, the nozzles 7 are arranged at right angles to the axis of the conduit 6 and the discharge openings from the nozzles on one side of the cylinder axis are at corresponding ends thereof and opposite to those openings in the corresponding ends of the nozzles on the opposite side of the cylinder axis, as indicated by the arrows in Fig. 2, so that the fuel is discharged from all of the nozzles in the same direction about the cylinder axis. Where a nozzle is provided coincidently with the cylinder axis, as shown, it is of cylindrical shape in cross section as shown at 7b and provided with lateral discharge openings 7c spaced around its side wall to discharge the fuel in all directions. By preference, the openings 7a' are arranged to inject the fuel into the air in the same direction in which the air is rotating and at approximately the same speed thereof, such arrangement of fuel injection combined with the motion of the air serving to insure complete admixture of the air and fuel and eliminating ignition retardation which might otherwise be present. The supply of fuel from the pipe 5 to the conduit 6 is controlled by a valve 8 which is operated intermittently in co-ordinated relation to the movement of the piston, the valve being connected to and operated by a rod 8a, which in turn is operated by a suitable cam (not shown). The piston head is preferably formed with recesses in line with the nozzles 7, 7b (see Fig. 7) to insure clearance. The valve 8 may be controlled in any desired manner; that is, to supply fuel during the intake of air piston stroke and compression stroke, or during the compression stroke only or as the piston approaches the end of the compression stroke.

The suction effect and compression of the air flowing through the shrouded intake valve 4a sets up in it a more or less whirling motion or condition, whereas the arrangement of discharge openings from the fuel supply nozzles not only injects vaporized fuel under pressure into this body of air, but such injection is effected simultaneously at different levels and upon opposite sides of the cylinder axis in the same direction, and in the direction in which the air is moving, so that fuel for each combustion charge is supplied simultaneously to different portions of the volume of air sucked into the cylinder; and as the fuel is injected under pressure it sets up a swirling effect in the resulting combustion charge. Accordingly by reason of the compressed air and the injected fuel having a rotational movement in the same direction and at substantially the same rate of speed, with the simultaneous injection of fuel into different portions of the volume of air, a complete and uniform admixture of air and fuel results to form a combustion charge capable of causing maximum pressure upon the piston.

Figure 7:
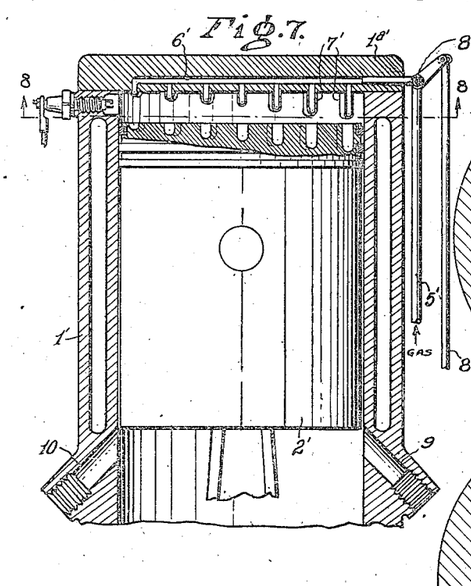
Fig. 7 is a fragmentary section of a two cycle engine embodying my invention.
Figure 8:
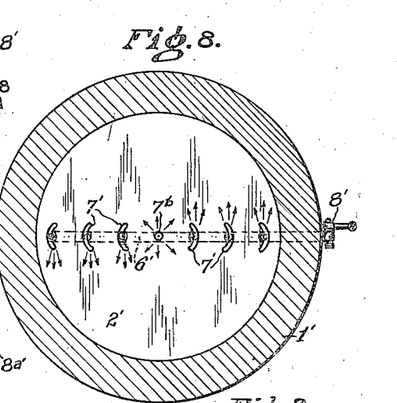
Fig. 8 is a section on the line 8—8 of Fig. 7.

Figs. 7 and 8 illustrate a two cycle engine comprising a cylinder 1' and a piston 2', the cylinder having an inlet 9 and an outlet 10. The air inlet 9 preferably leads into the cylinder at an angle (such as shown in dotted lines in Fig. 15) to impart a whirling or rotational motion to the air. The cylinder head 1a' is formed with a diametrical conduit 6', the outer end of which is connected to the supply pipe 5' for vaporized fuel under pressure. The conduit 6' is connected to nozzles 7' constructed and arranged as shown in Figs. 1 to 6, inclusive. The supply of carbureted air from the pipe 5' to the conduit 6' is controlled by a valve 8' which, through a rod 8a', is operated intermittently by a suitable cam (not shown).

Figures 9, 10, 11, 12, 13, 17:
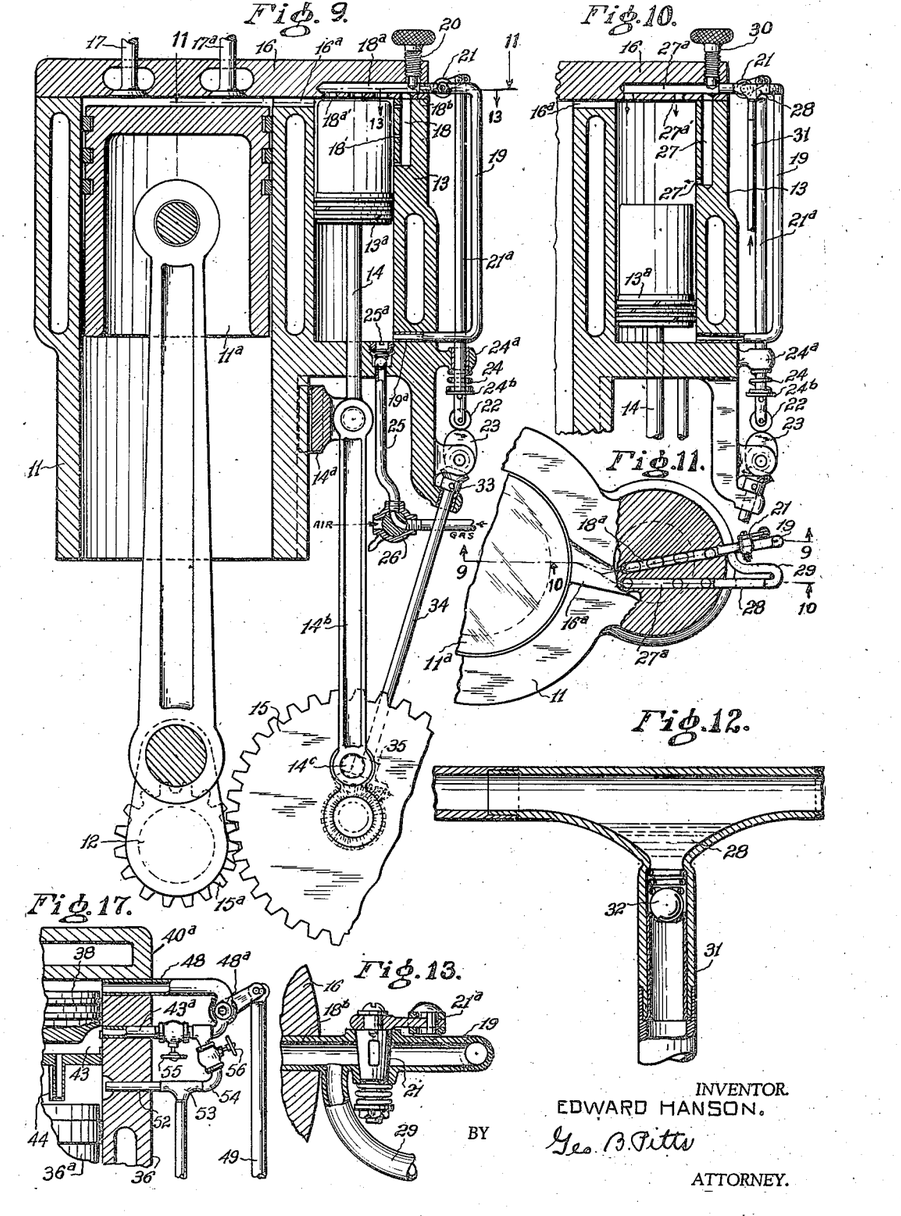
Fig. 9 is a fragmentary section of a modified form of four cycle engine embodying my invention, on the line 9—9 of Fig. 11.
Fig. 10 is a fragmentary sectional view of parts shown in Fig. 9, with the auxiliary piston shown in a different position, on the line 10—10 of Fig. 11.
Fig. 11 is a fragmentary section on the line 11—11 of Fig. 9.
Fig. 12 is a fragmentary section on the line 10—10 of Fig. 11, enlarged.
Fig. 13 is a fragmentary section on the line 9—9 of Fig. 11, enlarged.
Fig. 17 is a fragmentary view of parts shown in Fig. 15, enlarged.

Figs. 9, 10, 11, 12 and 13 illustrate a modified form of construction wherein provision is made for supplying to the combustion space fuel in liquid form or in a gaseous state for admixture with the air. In these views, 11 indicates a main cylinder having therein a piston 11a connected by a rod to a crank shaft 12. 13 indicates an auxiliary cylinder having therein a piston 13a drivingly connected through a rod 14, cross-head 14a and pitman 14b to a crank 14c, which is driven by gears 15, 15a, by the crank shaft 12. The gears 15, 15a, have a two-to-one ratio so that the piston 13a makes two complete strokes to four strokes of the piston 11a so as to be co-ordinated with the movement of the latter piston. The walls of the cylinders 11 and 13 may be formed integrally so that a single piece head 16 may be provided for both cylinders, the intermediate wall between the cylinders being cut-away at its upper end to form a conduit 16a leading from the combustion space in the upper end of the cylinder 13 to the cylinder 11. As shown in Fig. 11, the conduit 16a is disposed at an angle to an imaginary diameter of the cylinder 13, so that the air admitted through the in-take valve will impart a swirling motion to the fuel which is forced into the combustion space, as later set forth. 17 indicates an exhaust valve for the products of combustion and 17a indicates the valve for intake of pure air. The valves 17, 17a, are operated by suitable cams (not shown) on a shaft driven by the shaft 12 with a two-to-one reduction therebetween. The side wall of the cylinder 13 is formed with a recess 18 extending longitudinally thereof and the head 16 is formed with a recess 18a extending substantially diametrically of the cylinder 13 and communicating with the upper end of the recess 18 to form a fuel receiving chamber. The inner walls of the recesses 18, 18a, are formed with ports 18', 18a', respectively, through which the fuel is delivered to the cylinder 13 above the piston 13a. As shown, I provide a plurality of ports 18' and a plurality of ports 18a' so that the fuel, which is under pressure, may be injected into the air which is forced into the cylinder 13 by the compression stroke of the piston 11a. The recess 18a extends outwardly beyond the recess 18, as shown at 18b, and connected to a supply pipe 19. 20 indicates a valve mounted in the head 16 and arranged when operated to close the recess 18b and thus cut off the supply of fuel to the chamber 18, 18a, for reasons later set forth. The pipe 19 is connected with a conduit 19a and leading from the lower end of the cylinder 13 for a purpose later explained. 21 indicates a valve in the pipe 19 for controlling the supply of fuel to the chamber 18, 18a. The valve 21 is connected to a rod 21a provided at its lower end with a roller 22 which rides a cam 23, whereby the rod is reciprocated to open and close the valve 21, intermittently, such operation being co-ordinated with the strokes of the pistons 11, 13, as later set forth. A spring 24, interposed between the guide 24a for the rod 21a and a collar 24b fixed to the latter, normally tends to move the rod 21a downwardly to maintain the roller 22 in engagement with the cam 23, whereby the rod is operated in one direction by the spring 24 and in the opposite direction by the cam 23. 25 indicates a supply pipe connected with a source of supply of carbureted air or vapor under pressure and connected to the lower end of the cylinder 13. A suitable check valve 25a is provided in the pipe 25, preferably adjacent its connection with the cylinder 13 to prevent back-flow of the fuel. 26 indicates a three-way valve in the pipe, the casing for the valve having an air intake port, whereby the valve in one position permits flow of the fuel to the cylinder 13 and in its other position it cuts off the fuel supply and permits air to flow into the cylinder 13 when liquid fuel is being employed for the operation of the engine, as later set forth. The piston 13 moves downwardly during the intake and compression stroke of the piston 11a and moves upward during the power stroke and exhaust stroke thereof. In the up-stroke of the piston 13a, a predetermined quantity of carbureted air or vapor is drawn into the cylinder 13 and in the down-stroke of the piston this fuel is compressed in the cylinder 13 and pipe 19, so that upon the opening of the valve 21, the compressed fuel is forced into the chamber 18, 18a, and through the ports 18', 18a' into the air drawn in through the intake 17a, whereby admixture of the fuel and air takes place to provide a combustion charge.

I provide means for cutting out the supply of fuel or vapor and supplying or injecting fuel in liquid form to the cylinder 13. Of these means, 27 indicates a recess formed in the side wall of the cylinder 13, preferably parallel to and in close relation to the recess 18 and 27a indicates a recess formed in the head 16 and extending substantially parallel to the recess 18a and communicating with the recess 27 to form a fuel receiving chamber. The inner wall of the recess 27 is formed with a port 27' and the inner wall of the recess 27a is formed with a plurality of ports 27a', for injection of the liquid into the cylinder 13 above the piston therein. The recess 27a extends outwardly and is connected to a holder or reservoir 28, which is filled with liquid fuel, and the reservoir in turn is connected by a pipe 29 to the pipe 19 inwardly of the valve 21, for a purpose later set forth. 30 indicates a valve mounted in the head 16 and arranged to close off the chamber 27, 27a, when carbureted air or vapor is being employed, whereas when liquid fuel is being employed the chamber 18, 18a, is closed off by the valve 20. The reservoir 28 is connected, preferably through its bottom wall, to a pipe 31, which is connected to a liquid fuel supply source and a suitable pump (not shown) arranged to operate in co-ordinated relation to the valve 21. A suitable check valve 32 is provided in the connection of the pipe 31 with the reservoir 28.

When employing liquid fuel as the combustible medium, the valve 20 is closed, the valve 30 is opened and the valve 26 is positioned to connect its air port with the pipe 25, so that in the up-stroke of the piston 13a air is drawn into the cylinder 13 and in the down-stroke thereof the air is compressed in the cylinder 13 and pipe 19; and upon the opening of the valve 21, under control of the cam 23, the air under pressure flows through the pipe 19, pipe 29 and reservoir 28 in contact with the liquid fuel in the latter, whereby a portion of the fuel is borne with the air into the chamber 27, 27a, and then injected into the cylinder 13 through the ports 27', 27a'. In this arrangement the pump (not shown), which is connected to the pipe 31, serves to maintain a predetermined level of liquid fuel in the reservoir 28, for which purpose the pump is arranged to operate in co-ordinated relation to the opening of the valve 21; that is, the active stroke of the pump takes place when the valve 21 is closed, so that during air flow the liquid in the reservoir 28 will be in a state of equilibrium. The supply pump may be of any well known construction for which reason it is not illustrated. The pump is constructed to force into the reservoir 28 in each active stroke a quantity of liquid fuel equal to that injected into the chamber 27, 27a, with the previous charge of compressed air from the pipe 19.

From the foregoing description it will be seen that the engine may be supplied with a combustible medium, either in the form of carbureted air or liquid, merely by the closing of the valve 20, opening of the valve 30 and operation of the valve 26 and starting of the supply pump to feed the fuel through the pipe 31.

The shaft for the cam 23 is preferably drivingly connected through miter gears 33 to a shaft 34, which in turn through miter gears 35, is driven by the shaft for the crank 14c.

Figs. 14, 15, 16 and 17 illustrate a two cycle type of engine, wherein are embodied the specific fuel injection features shown in Figs. 1 to 6, inclusive, and the means whereby either vaporized fuel or fuel in a liquid state may be employed as the combustible medium. In these views, 36 indicates a cylinder having therein a reciprocating piston 36a and formed in its side wall with an exhaust 37 for the products of combustion and an inlet 37a for air, the latter being arranged at an inclined angle (see dotted lines in Fig. 16) to effect a whirling motion in the air as it flows into the cylinder. The piston 36a is reciprocated by a pitman 36b, connected to a crank shaft 36c. 38 indicates a separate piston which reciprocates in the cylinder 36 above the piston 36a, the space between the pistons forming the combustion chamber. The piston 38 is connected to a rod 39, which reciprocates in an opening 40 formed in the cylinder head 40a. The rod 39 is connected to a cross head 41, the latter being connected by rods 42 to eccentrics on the shaft 36c, whereby the piston 38 is operated in co-ordinated relation to the reciprocations of the piston 36a. The piston 38 is formed with a fuel conduit 43 extending diametrically thereof and having an enlarged opening leading through one side of the piston, adapted to register during fuel injection thereto with a duct 43a formed in the side wall of the cylinder. The lower wall of the conduit 43 is formed with ports to which are connected nozzles or injectors 44. The nozzles 44 are constructed and arranged and provided with discharge openings similar to the nozzles 7 and their discharge openings 7a' as described in connection with the form of construction shown in Figs. 1 to 6, inclusive. The vaporized fuel is supplied under pressure from a suitable source by a conduit or pipe 45 to the cylinder 36 through a duct 45a formed in the head 40a and opening into the cylinder above the piston 38, a check valve 46 being provided in the conduit to prevent back-flow of fuel or air. A three-way valve 47 is connected in the conduit 45 to permit the supply of the fuel to the cylinder, when the valve is in one position and when in its other position it closes off the fuel supply and admits air into the cylinder 36 above the piston 38. In the down-stroke of the piston 38 a charge of vaporized fuel is drawn into the cylinder 36 from the supply pipe 45 and in the upstroke of the piston 38 this fuel is compressed in the cylinder and by means of a pipe 48, which is connected to the duct 43a, the compressed fuel is conducted into the conduit 43, upon the operation of a valve 48a, and discharged by the nozzles 44 into the combustion space for admixture with the air therein in the manner already set forth. The combustible charge is ignited by a suitable spark plug 44'. The valve 48a is opened and closed intermittently in co-ordinated relation to the up-stroke of the piston 38a by a rod 49, which is connected to one end of a rocker 49a, the other end of the rocker having engagement with a cam 50 fixed to the shaft 36c. A spring 51 surrounding the rod 49 and interposed between a guide 49b therefor and a collar 51a fixed to the rod, normally tends to move the rod 49 endwise in one direction and the cam 50 through the rocker 49a serves to move the rod endwise in the opposite direction, so that the valve 48a is operated in co-ordinated relation to the movements of the pistons 36a, 38. 52 indicates a conduit connected at its inner end with the combustion space or chamber between the pistons 36a, 38, and connected at its outer end with the inner end of a reservoir for liquid fuel, as shown at 53. The reservoir is similar in construction to that shown in Fig. 12 and connected to a liquid fuel supply pipe 53a and provided with a check valve as shown in this identified view. The supply of liquid fuel through pipe 53a is effected intermittently in co-ordinated relation to the operation of the valve 48a, as already set forth. The outer end of the reservoir 53 is connected by a pipe 54 to the pipe 48 inwardly of the valve 48a. The pipe 48 is provided with a valve 55 so as to close the duct 43a when liquid fuel is being used as the combustible medium and the pipe 54 is provided with a valve 56 to close it when vaporized fuel is being used as the combustible medium.

When employing liquid fuel as the combustible medium, the valve 55 is closed, the valve 56 is opened and the valve 47 is operated to admit into the cylinder 36 above the piston 38 air, which is drawn thereinto in the down-stroke of the piston, so that in its up-stroke the air is compressed in the cylinder 36 and pipe 48 and upon the opening of the valve 48a, under control of the cam 50, the air under pressure flows through the pipes 48 and 54 and reservoir 53 in contact with the liquid fuel in the latter, whereby a portion of the fuel is borne with the air through the pipe 52 into the combustion space.

Figures 4, 5, 6, 14, 15, 16:
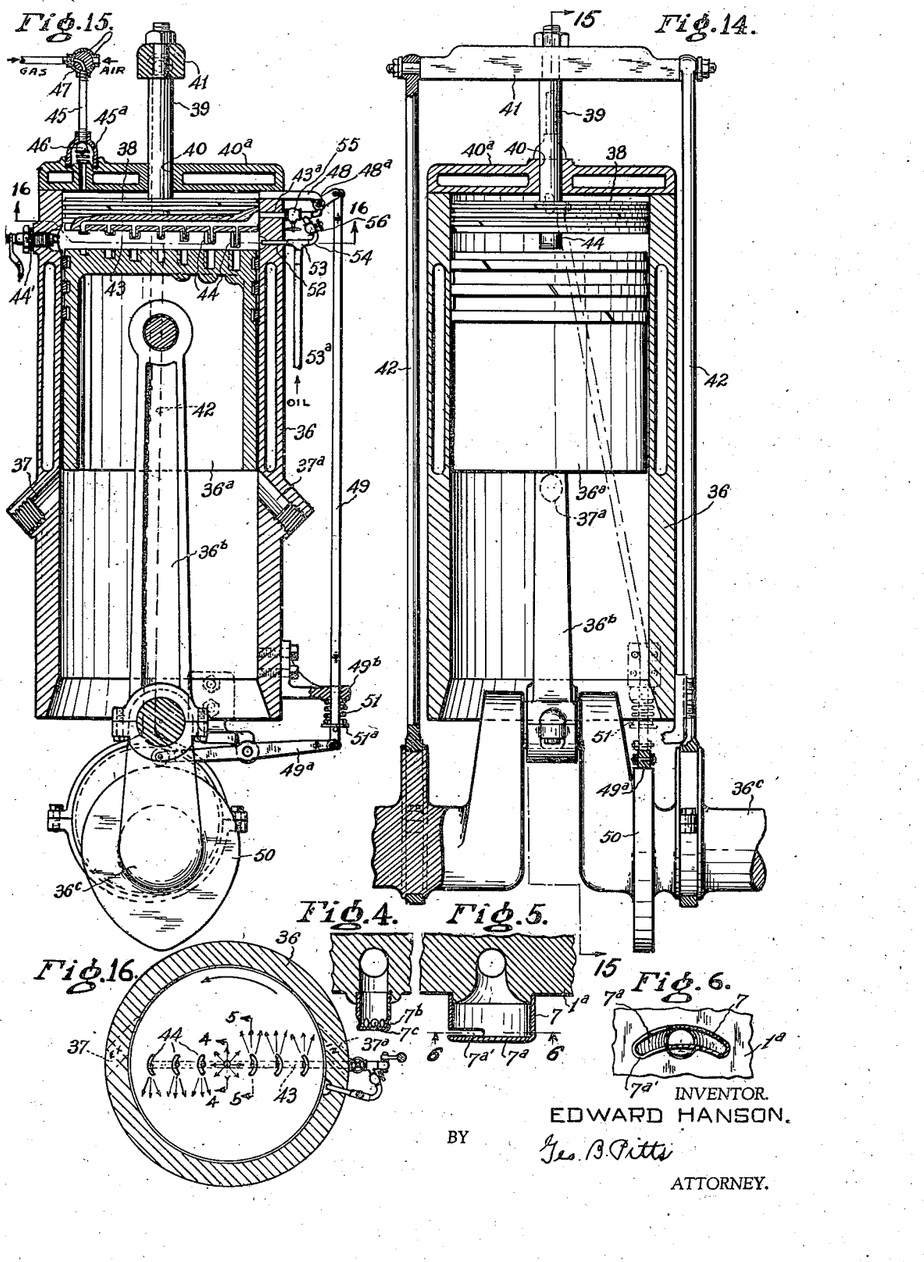
Fig. 4 is a fragmentary section on the line 3—3 of Fig. 2 and on the line 4—4 of Fig. 16.
Fig. 5 is a fragmentary section on the line 5—5 of Figs. 2 and 16.
Fig. 6 is a section on the line 6—6 of Fig. 5.
Fig. 14 is a sectional view of a two cycle engine embodying my invention.
Fig. 15 is a section on the line 15—15 of Fig. 14.
Fig. 16 is a section on the line 16—16 of Fig. 15.
Figures 18, 19, 20, 21, 22, 23:
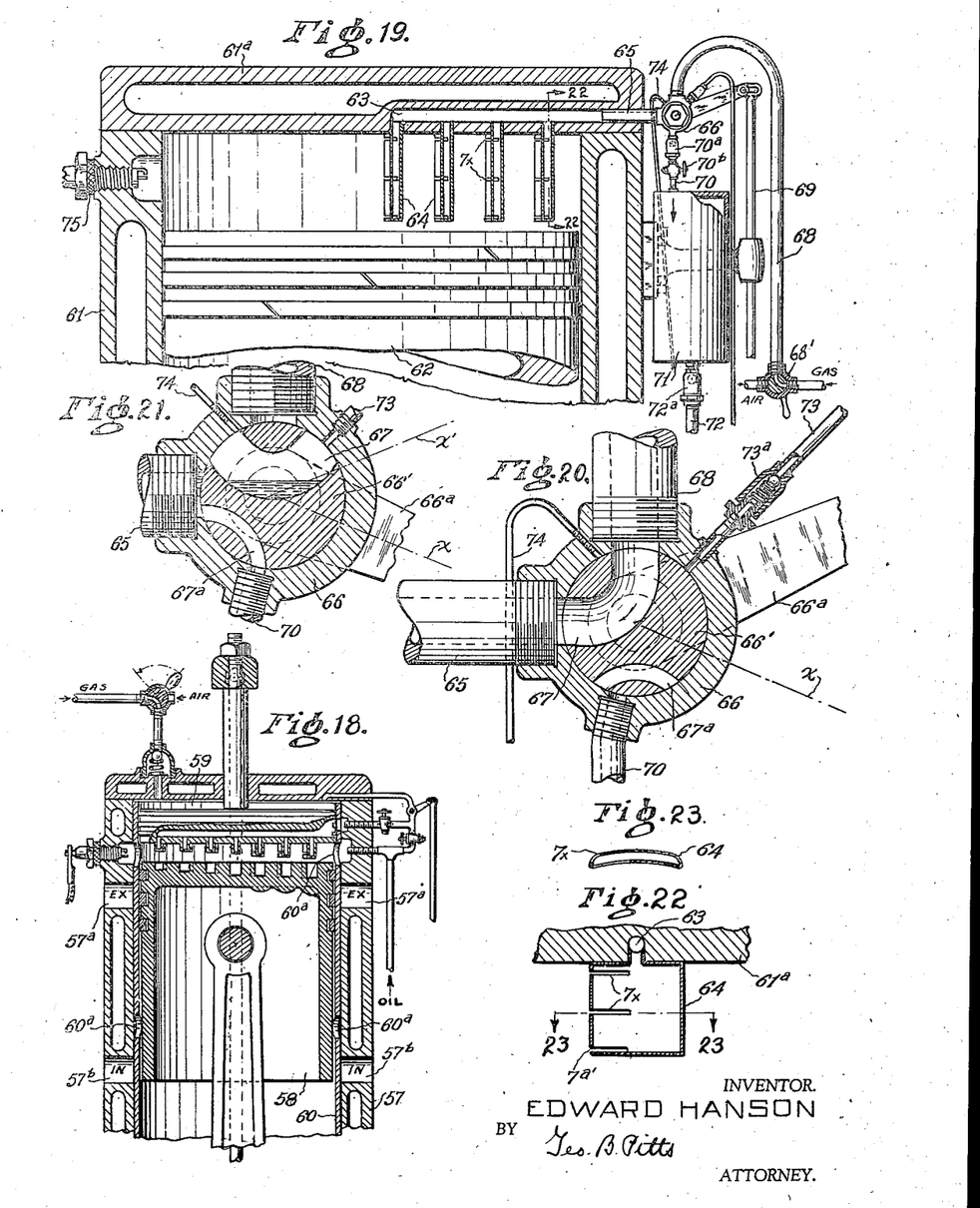
Fig. 18 is a view similar to Fig. 15, but showing a modified form of construction.
Fig. 19 is a fragmentary section showing a further modified form of construction.
Fig. 20 is a sectional view of the valve shown in Fig. 19, enlarged.
Fig. 21 is a view similar to Fig. 20, showing the valve in another position.
Fig. 22 is a fragmentary section on the line 22—22 of Fig. 19.
Fig. 23 is a section on the line 23—23 of Fig. 22.

Fig. 18 illustrates a two cycle type of engine similar to that shown in Figs. 14, 15, 16 and 17, but slightly modified to provide a sleeve which controls the inlet of air and exhaust of the products of combustion. In this view 57 indicates a cylinder in which pistons 58, 59, reciprocate by means of a crank shaft and eccentrics as shown in Figs. 14 and 5. Provision is made to supply vaporized fuel or liquid fuel as the combustible medium in the manner as already described. The cylinder 57 is provided with exhaust ports 57a and air inlet ports 57b, which ports are controlled by a sleeve 60 having openings 60a arranged to register with the ports 57a, 57a, in co-ordinated relation to the reciprocation of the piston 58, due to the reciprocation of the sleeve by a cam (not shown) driven by the crank shaft for the piston 58.

Fig. 19 is a fragmentary sectional view showing another or different embodiment of the invention, which embodiment may be of the two cycle or four cycle type. The air inlet and exhaust valves therefor are not shown. In this form of construction, I provide means for supplying to the combustion chamber the combustible medium in either vaporized or liquid form and means for recovering from the combustion chamber of the engine unburned fuel which may be delivered to the source of supply and re-injected into the combustion chamber, whereby saving in fuel cost results. Referring to Figs. 19, 20, 21, 22 and 23, 61 indicates a cylinder having a head 61a and 62 indicates a piston arranged to be reciprocated in the usual way. Where the engine is of the four cycle type the exhaust and air inlet valves will be mounted in the head 61a and the latter valve shrouded as shown at 4a' in Fig. 3, so as to impart into the air a circular or whirling motion. Where the engine is of the two cycle type the exhaust and inlet will be formed in the side wall of the cylinder 61, with the inlet extending at an angle to an imaginary radius as shown in dotted lines in Fig. 16, to impart to the air a whirling motion. The head 61a is formed with a recess 63 extending inwardly from its side edge any desired distance. The lower wall of the recess 63 is formed with a plurality of ports to each of which is connected an injector or nozzle 64 depending from the head 61a into the combustion space. Each nozzle 64 is similar in construction to the nozzles 7 (see Figs. 4 and 5) except instead of having one discharge opening 7a' I provide two additional discharge openings 7x, on the same side as the opening 7a', one near the head 61a and the other approximately midway the length of the nozzle (see Fig. 22), a plurality of discharge openings being desirable where the number of nozzles is reduced so as to insure the supply of sufficient fuel in proportion to the volume of air drawn into the cylinder. The outer end of the recess 63 is connected to a conduit 65, which leads from a four-way valve 66, the valve element 66' of the valve 66 being formed with ducts 67, 67a. 68 indicates a fuel supply pipe, which is connected to the valve 66 and leads (a) from a source of vaporized fuel under pressure, when such fuel is used as the combustible medium and (b) from a source of air under pressure, when liquid fuel is to be used as the combustible medium, as later described, such alternate supply connection being attained by a suitable two-way valve 68'. The valve element 66' of the valve 66 is oscillated by a rod 69 (to which the element 66' is connected by an arm 66a) to and from the positions indicated by the lines $x$, $x'$. The rod 69 is reciprocated endwise by a cam (not shown) having driving connection with the engine crank shaft, so as to intermittently supply the fuel to the combustion space in co-ordinated relation to the reciprocations of the piston 62. When vaporized fuel is being supplied by the pipe 68, the inlet and outlet ports of the duct 67 register with the adjacent ends of the conduit 65 and supply pipe 68, in the movement of the valve element 66' to position $x'$, whereby the vaporized fuel flows through duct 67 and pipe 65 into the recess 63 and through the nozzles 64 into the combustion space. The valve element 66' then oscillates to the position, indicated by the dot-and-dash line $x$, wherein the fuel supply from the pipe 68 is cut off and the inlet and outlet ports of the duct 67a register with the adjacent ends of the conduit 65 and a pipe 70 leading from the valve 66 to a receiver 71, such oscillations of the valve element 66' being timed so that when combustion is effected, or immediately following each combustion, in the combustion chamber the duct 67 is disconnected from the conduit 65 and pipe 68 and the duct 67a is connected to the conduit 65 and pipe 70, to permit the unburned vapor in the nozzles 64 and recess 63, due to the pressure therein incident to the combustion, to be forced through the conduit 65, duct 67a and pipe 70 into the receiver 71. The pipe 70 is provided with a casing 70a which contains a suitable check valve to prevent backflow of the vapor in the receiver 71. The receiver 71 is connected by a pipe 72 to the second or third stage of a suitable multi-stage compressor, from which the vapor is returned to the original source of vaporized fuel supply. As a multi-stage compressor is a well known construction, it therefore is not illustrated. The pipe 72 may be provided with a casing 72a which contains a suitable check valve to prevent back-flow of the vapor from the pipe to the receiver 71.

73 indicates a supply pipe for liquid fuel leading from a source of supply provided with a pump (not shown), the active stroke of which is co-ordinated with the movement of the valve element 66' and is arranged to deliver at each stroke a predetermined quantity of liquid fuel into the duct 67, which then serves as a reservoir or holder, a check valve 73a being provided in the pipe 73 to prevent back-flow of the liquid fuel. When liquid fuel is used as the combustible medium, the valve 68' in the pipe 68 is operated to shut off the supply of carbureted air or vapor and admit air under pressure to the pipe 68 and the valve element 66' is arranged to be oscillated, as already set forth. As shown in Fig. 21, when the valve element 66' is in the position indicated by the line $x$ the inlet port of the duct 67 registers with the pipe 73 so as to receive fuel therefrom, its outlet port being closed except for its connection with a vent or discharge pipe 74 to which reference is later set forth. Upon movement of the valve element 66' to the position indicated by the line $x'$, the duct ports register with the pipes 65 and 68, so that the compressed air from the latter pipe is effective to blow the liquid fuel supplied to the duct from the supply pipe 73 through the pipe 65, recess 63 and nozzles 64 for admixture with the air drawn into the combustion space in the cylinder 61, whereby combustion is effected due to compression, or ignition by the spark plug 75 where the construction of the engine is such as to require a spark plug or its equivalent means. In the event unburned fuel due to combustion is forced back into the duct 67 while its outlet port remains in registry with the pipe 65, such fuel which has been vaporized by its admixture with the air in the cylinder, will escape through the vent 74 into the first stage intake of the multi-stage compressor, to which the vent is connected.

70b indicates a shut-off mounted in the pipe 70 when the receiver 71 is not employed.

From the foregoing description it will be noted that I provide a form of air inlet whereby the supplied air is caused to circulate in a rotary or whirling direction and that the fuel is injected into the moving air through a plurality of ports or nozzles simultaneously and that in certain of the disclosed forms the fuel is injected in the same direction and at a speed or rate of flow corresponding to that of the moving air, thereby producing a turbulence in the air and an effective admixture of the air and fuel. Due to the correspondence in speed and direction of movement of the air and fuel, ignition or combustion is not retarded and flame propagation is such as to effect maximum pressure on the piston. While I provide for the supply of either vapor or liquid fuel, the arrangement is such that certain of the supply connections are used for the supply of either combustible medium, thereby materially simplifying the construction. It will also be noted that the valve for intermittently controlling the supply of fuel is disposed exteriorly of the engine and therefore is not affected by the heat due to operation thereof.

It will also be noted that the improvements herein disclosed and claimed are applicable to engines wherein the compression in the combustion space is high enough to effect combustion due to heat, as well as where a low or medium compression is provided and necessitating auxiliary means, such as a spark plug, to cause ignition of the combustible charge.

To those skilled in the art to which my invention relates, many changes in construction and widely differing embodiments and applications of the invention will suggest themselves without departing from the spirit and scope thereof. My disclosures herein are purely illustrative and are not intended to be in any sense limiting.

What I claim is:

1. An internal combustion engine having a cylinder, a piston therein, a combustion chamber, an exhaust, an inlet for the air drawn into the combustion chamber, a conduit having therealong a series of jets through which a combustible medium under pressure is injected into the combustion chamber for admixture with the air, a valve in said conduit, and means for intermittently operating said valve.

2. An internal combustion engine having a cylinder, a piston therein, a combustion chamber, an exhaust, an inlet for the air drawn into the combustion chamber, a plurality of jets through which a combustible medium under pressure is injected into the combustion chamber for admixture with the air, said jets consisting of nozzles mounted in the cylinder and each disposed parallel to the axis thereof and formed with lateral discharge openings arranged to discharge the combustible medium at different levels axially of the cylinder, and means for intermittently supplying the combustible medium to said nozzles.

3. An engine as claimed in claim 2 wherein the inlet is arranged to impart a whirling action to the air and the nozzles depend from the cylinder head, the openings from the nozzles on one side of the cylinder axis being arranged to discharge the combustible medium in a direction opposite to direction of discharge of the combustible medium from the openings from the nozzles on the other side of the cylinder axis, and in the direction in which the air is whirling.

4. An internal combustion engine comprising a cylinder having a head, an air inlet, a piston in said cylinder and an exhaust, said head being formed with a recess, a plurality of nozzles in connected relation to said recess and depending from said head and said nozzles being in spaced relation diametrically of said cylinder, and means for supplying a combustible medium under pressure to said recess, said means including a valve and devices for operating said valve intermittently to supply the medium to said recess in co-ordinated relation to the movement of said piston.

5. An internal combustion engine comprising a cylinder having a head, an exhaust and an air inlet arranged to impart a whirling motion to the air drawn into the cylinder, a piston in said cylinder, said head being formed with a recess, a plurality of nozzles in connected relation to said recess and depending from said head in spaced relation diametrically of said cylinder, said nozzles having lateral discharge openings, those openings on one side of the cylinder axis being arranged to discharge the combustible medium opposite to those openings on the other side of the cylinder axis and in the same direction in which the air is whirling, and means for supplying a combustible medium to said recess, said means including a valve and devices for operating said valve intermittently to supply the medium to said recess in co-ordinated relation to the movement of said piston.

6. An internal combustion engine having a cylinder and a piston therein, a separate piston movable relative and in co-ordinated relation to the movement of the first mentioned piston, a supply connection having a valve arranged to admit vaporized fuel or air to one side of the separate piston for compression thereby, a conduit leading from the compression side of said separate piston to the opposite side thereof, means including a reservoir for supplying liquid fuel to the opposite side of said separate piston and having a connection outwardly of said reservoir with said conduit, shut-off valves in said connection and said conduit, whereby the medium compressed by said separate piston flows through said conduit to the opposite side of said separate piston or to said reservoir, and an intermittently operated valve for controlling the flow of the compressed medium through said conduit.

7. An internal combustion engine having a main cylinder provided with an inlet and an exhaust and a piston therein, an auxiliary cylinder and a piston in the latter cylinder, a conduit between said cylinders, separate supply connections leading to the upper end of said auxiliary cylinder one leading from liquid fuel supply and the other leading from the lower end of said auxiliary cylinder, a shut-off valve in each of said connections, whereby either supply connection may be closed, a separate supply pipe connected to the lower end of said auxiliary cylinder and leading from a supply of vaporized fuel supply, said separate supply pipe being provided with a valve arranged to shut off the supply of vaporized fuel and admit air to said pipe, whereby the fuel supplied to the lower end of said auxiliary cylinder is compressed by the down-stroke of the piston therein, a pipe connecting said supply connections, a valve in the connections leading from the lower end of said auxiliary cylinder arranged between said cylinder end and its connection with the last mentioned pipe, and means for intermittently operating said valve in co-ordinated relation to the movements of said pistons.

8. An internal combustion engine having a main cylinder provided with an exhaust and an inlet, a piston therein, an auxiliary cylinder and a piston therein, a conduit between said cylinders, the wall of said auxiliary cylinder being formed with chambers each having ports for injecting fuel into the upper end of said auxiliary cylinder, a valve for closing the inlet to each chamber, a supply pipe leading from a source of liquid fuel connected to the inlet for one of said chambers, a separate supply pipe leading from the lower end of said auxiliary cylinder to the inlet for the other chamber, a pipe connecting said supply pipes, whereby by the operation of one of said closing valves, a selected one of said supply pipes is operatively connected to the adjacent chamber, a valve in said separate supply pipe in advance of the pipe for connecting said supply pipes together, a second supply pipe connected to the lower end of said auxiliary cylinder and leading from a source of vaporized fuel supply and provided with a valve arranged to permit vaporized fuel to flow to said cylinder or to shut off the fuel supply and permit air to flow to said cylinder, whereby the fuel so supplied is compressed by the down-stroke of the piston in said auxiliary cylinder, and means for intermittently operating the valve in said separate supply pipe in co-ordinated relation to the movements of said pistons.

9. An internal combustion engine having a main cylinder provided with an exhaust and an inlet, a piston therein, an auxiliary cylinder and a piston therein, a conduit between said cylinders, the upper end of said auxiliary cylinder being provided with inlet means for fuel, a supply pipe leading from a source of liquid fuel connected to said inlet means, a separate supply pipe leading from the lower end of said auxiliary cylinder and connected to said inlet means, a pipe for connecting said supply pipes together, separate valves in said supply pipes beyond the connection of the last mentioned pipe thereto arranged to shut off the supply from each supply pipe to said inlet means, a valve in said separate supply pipe in advance of the connection of the last mentioned pipe thereto, a second supply pipe connected to the lower end of said auxiliary piston and leading from a source of vaporized fuel supply and provided with a valve arranged to permit flow of vaporized fuel to said auxiliary cylinder or permit air to flow thereto, whereby the fuel so supplied to the auxiliary piston is compressed by the down-stroke thereof, and means for intermittently operating the valve in said separate supply pipe in co-ordinated relation to the movements of said pistons.

10. An internal combustion engine having a cylinder provided with an exhaust and an inlet, a main piston and an auxiliary piston in said cylinder and forming a combustion space between them, means for relatively moving said pistons in co-ordinated relation, said auxiliary piston being formed with a recess having a port leading into the combustion space, a conduit having its inlet end connected to said cylinder above said auxiliary cylinder and arranged to register at its other end with the inlet opening for said recess in a predetermined position of said auxiliary piston, a valve in said conduit, a branch conduit leading from said first mentioned conduit outwardly of said valve to said cylinder below the auxiliary piston when the latter is in or approaches its uppermost position, a valve in said branch conduit, a supply pipe leading from a source of liquid fuel connected to said branch conduit between the valve therein and its connection with said cylinder, a valve in said conduit in advance of the connection of the branch conduit thereto, a separate supply pipe connected to said cylinder above the auxiliary piston therein and leading from a source of vaporized fuel supply and provided with a valve arranged to permit flow of vaporized fuel to said cylinder or permit air to flow thereto, whereby the fuel so supplied to the cylinder is compressed by the up-stroke of said auxiliary piston, and means for intermittently operating the last mentioned valve in said conduit in co-ordinated relation to the movements of said pistons.

11. An internal combustion engine as claimed in claim 10 wherein the branch conduit is provided with a reservoir and means are provided for maintaining a predetermined quantity of liquid fuel in said reservoir.

12. An internal combustion engine as claimed in claim 10 wherein the recess in said auxiliary piston extends diametrically thereof and said piston is provided with a plurality of ports for injecting fuel into the combustion space.

13. An internal combustion engine as claimed in claim 10, wherein the recess in said auxiliary piston extends diametrically thereof and said piston is provided with a plurality of nozzles in connected relation to said recess and depending into the combustion space and having discharge openings arranged to discharge the fuel at different levels.

14. An internal combustion engine as claimed in claim 10, wherein the recess in said auxiliary piston extends diametrically thereof and said piston is provided with a plurality of nozzles in connected relation to said recess and depending into the combustion space, said nozzles having lateral discharge opening arranged to discharge the fuel at different levels, the openings in the nozzles on one side of the cylinder axis being disposed opposite to the openings in the nozzles on the other side of the cylinder axis.

15. An internal combustion engine having a cylinder provided with an exhaust and an inlet and a piston in said cylinder, fuel supply means for said cylinder having an inlet supply pipe, a four way valve to which said pipe is connected, a separate pipe connected to said valve and leading from a source of vaporized fuel under pressure, a receiver connected to said valve, the valve element of said valve being formed with a duct arranged to register with said inlet pipe and said separate pipe in one position of said element and a duct arranged to register with said inlet pipe and the connection to said receiver in another position of said valve to permit flow of unburned fuel to said receiver, and means for operating said valve in co-ordinated relation to the movement of said piston.

16. An internal combustion engine as claimed in claim 15, wherein means are provided for removing fuel from said receiver.

17. An internal combustion engine having a cylinder provided with an exhaust and an inlet, and a piston in said cylinder, fuel supply means for said cylinder having an inlet supply pipe, a four-way valve to which said pipe is connected, the valve element of said valve being arranged to oscillate to and from predetermined positions, a separate pipe connected to said valve and leading from a source of vaporized fuel under pressure and provided with a valve arranged to shut off the vaporized fuel supply and admit air under pressure to said pipe, a second pipe connected to said valve and leading from a source of liquid fuel under pressure, and a receiver connected to first mentioned said valve, the valve element of first mentioned said valve being provided with an inlet duct arranged to register with said liquid fuel supply pipe and an outlet duct arranged to register with said inlet supply pipe and the connection with said receiver when said element is in one predetermined position and in moving to its other position to register said inlet duct with said inlet pipe, said inlet duct is arranged to register with said separate supply pipe.

18. An internal combustion engine as claimed in claim 17, wherein the four-way valve is provided with a vent with which said inlet duct registers when moving to its fuel receiving position.

19. The process of providing a combustion charge in the combustion space of an internal combustion engine having an air inlet arranged to impart to the air drawn into the cylinder through the inlet during the in-take and compression stroke of the piston a rotary motion of the cylinder and injecting into the air in jet form fuel under pressure corresponding in direction and speed to that of the air.

20. An internal combustion engine having a cylinder, a piston therein, a combustion space, an exhaust, an inlet for air leading to the combustion space, fuel inlet means leading into the combustion space, supply pipes leading from sources of vaporized fuel under pressure and liquid fuel under pressure, respectively, and valve means between said supply pipes and said inlet means for controlling the supply of either fuel into said inlet means and shutting off the supply of the other fuel.

21. An internal combustion engine having a cylinder, a piston therein, a combustion space, an exhaust, an inlet for air leading to the combustion space, fuel inlet means leading into the combustion space, supply pipes leading from sources of vaporized fuel under pressure and liquid fuel under pressure, respectively, a pipe connecting said supply pipes together, a valve in each supply pipe between the connection of said last mentioned pipe thereto and said inlet means, a separate valve in one of said supply pipes in advance of the connection of said last mentioned pipe thereto, and means for intermittently operating said separate valve in co-ordinated relation to the movement of said piston.

22. An internal combustion engine having a cylinder, a piston therein, a combustion space, an exhaust, an inlet for air leading to the combustion space, fuel inlet means leading into the combustion space, supply pipes leading from sources of vaporized fuel under pressure and liquid fuel under pressure, respectively, the supply pipe leading from the source of vaporized fuel being provided with a valve arranged to shut off the flow of vaporized fuel thereto and admit air under pressure into said pipe, a pipe connecting said supply pipes together, a valve in each supply pipe between the connection of said last mentioned pipe thereto and said inlet means, a separate valve in one of said supply pipes in advance of the connection of said last mentioned pipe thereto, and means for intermittently operating said separate valve in co-ordinated relation to the movement of said piston.

EDWARD HANSON.